(12) United States Patent
Surendranath et al.

(10) Patent No.: US 11,205,795 B2
(45) Date of Patent: Dec. 21, 2021

(54) REINFORCED MATRIX FOR MOLTEN CARBONATE FUEL CELL AND METHOD FOR MANUFACTURING THE SAME

(71) Applicant: FuelCell Energy, Inc., Danbury, CT (US)

(72) Inventors: Arun Surendranath, Danbury, CT (US); Abdelkader Hilmi, Bethel, CT (US); Chao-Yi Yuh, New Milford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 339 days.

(21) Appl. No.: 15/357,607

(22) Filed: Nov. 21, 2016

(65) Prior Publication Data
US 2018/0145363 A1 May 24, 2018

(51) Int. Cl.
*H01M 8/14* (2006.01)
*H01M 4/86* (2006.01)
*H01M 4/90* (2006.01)
*H01M 8/0295* (2016.01)

(52) U.S. Cl.
CPC ......... *H01M 8/145* (2013.01); *H01M 4/8605* (2013.01); *H01M 4/905* (2013.01); *H01M 4/9033* (2013.01); *H01M 8/0295* (2013.01); *H01M 8/142* (2013.01); *H01M 2008/147* (2013.01); *H01M 2300/0051* (2013.01); *Y02E 60/50* (2013.01); *Y02P 70/50* (2015.11)

(58) Field of Classification Search
CPC ............. H01M 4/8621; H01M 4/8605; H01M 4/9066; H01M 8/0295; H01M 8/145; H01M 2008/147; H01M 2300/0051; H01M 4/905; H01M 4/9033; H01M 8/142; Y02E 60/526; Y02E 60/50; Y02P 70/56; Y02P 70/50
USPC ........................................................ 429/478
See application file for complete search history.

(56) References Cited

U.S. PATENT DOCUMENTS

| 3,466,197 | A | | 9/1969 | Bawa |
| 4,322,482 | A | | 3/1982 | Bushnell et al. |
| 4,781,996 | A | * | 11/1988 | Toriya ................. H01M 8/0295 |
| | | | | 429/469 |

(Continued)

FOREIGN PATENT DOCUMENTS

| DE | 19935271 A1 | 2/2001 |
| DE | 19936087 A1 | 2/2001 |
| JP | 05-319949 | 3/1993 |

OTHER PUBLICATIONS

Daniel, et al., "Coating of Ceramic Fibers With Yttria Films," Advances in Ceramic-Matrix Composites II, No. 46, Jan. 1, 1994, pp. 913-924.

(Continued)

*Primary Examiner* — Jonathan G Jelsma
*Assistant Examiner* — Omar M Kekia
(74) *Attorney, Agent, or Firm* — Foley & Lardner LLP (57) ABSTRACT

A reinforced electrolyte matrix for a molten carbonate fuel cell includes a porous ceramic matrix, a molten carbonate salt provided in the porous ceramic matrix, and at least one reinforcing structure comprised of at least one of yttrium, zirconium, cerium or oxides thereof. The reinforcing structure does not react with the molten carbonate salt. The reinforced electrolyte matrix separates a porous anode and a porous cathode in the molten carbonate fuel cell.

20 Claims, 6 Drawing Sheets

(56) References Cited

U.S. PATENT DOCUMENTS

| | | | | |
|---|---|---|---|---|
| 4,895,774 | A | * | 1/1990 | Ohzu .................. H01M 8/142 |
| | | | | 429/478 |
| 5,316,555 | A | * | 5/1994 | Ong .................. H01M 8/0295 |
| | | | | 29/623.1 |
| 5,595,832 | A | | 1/1997 | Tomimatsu et al. |
| 5,795,671 | A | * | 8/1998 | Nirasawa ............ H01M 8/0295 |
| | | | | 429/460 |
| 5,869,203 | A | | 2/1999 | Huang et al. |
| 7,678,470 | B2 | | 3/2010 | Yoon et al. |
| 7,790,327 | B2 | | 9/2010 | Ham et al. |
| 2005/0136188 | A1 | * | 6/2005 | Chang ............... H01J 37/32477 |
| | | | | 427/421.1 |
| 2011/0287333 | A1 | * | 11/2011 | Shin .................. H01M 8/0295 |
| | | | | 429/478 |
| 2014/0038081 | A1 | * | 2/2014 | Jian .................. H01M 8/04201 |
| | | | | 429/509 |
| 2015/0270559 | A1 | * | 9/2015 | Onuma ............... H01M 8/0618 |
| | | | | 429/410 |

OTHER PUBLICATIONS

International Search Report and Written Opinion in PCT/US2017/052430, dated Nov. 16, 2017 (17 pages).

Harlan, Nicole R.; Phase Distribution and Residual Stresses in Melt-Grown Eutectics; 2002; pp. 2025-2032.

Freim, John, et al.; Development of Novel Microstructures in Zirconia-Toughened Alumina Using Rapid Solidification and Shock Compaction; 1996; pp. 110-119.

* cited by examiner

REINFORCED MATRIX FOR MOLTEN CARBONATE FUEL CELL AND METHOD FOR MANUFACTURING THE SAME

STATEMENT OF GOVERNMENT RIGHTS

The Government has rights in this invention pursuant to Contract No. DE-EE0006606 awarded by the U.S. Department of Energy.

BACKGROUND

This application relates to fuel cells and, in particular, to a fuel cell matrix and a method of making the fuel cell matrix for use in molten carbonate fuel cells.

A fuel cell is a device which directly converts chemical energy stored in hydrocarbon fuel into electrical energy by an electrochemical reaction. Generally, a fuel cell includes an anode and a cathode separated by an electrolyte that conducts charged ions. In order to produce sufficient power, individual fuel cells are stacked in series with an electrically-conductive separator plate between each cell.

Molten carbonate fuel cells ("MCFCs") generally operate at high temperatures of 575° C. to 665° C. using fuel containing carbon dioxide and carbon monoxide. A conventional MCFC assembly includes a porous nickel anode and a porous lithiated nickel oxide cathode, separated by an electrolyte matrix storing carbonate electrolyte, such as mixtures of lithium carbonate/potassium carbonate ($Li_2CO_3$/$K_2CO_3$) or lithium carbonate/sodium carbonate ($Li_2CO_3$/$Na_2CO_3$). MCFCs generate power by passing a reactant fuel gas through the anode, while oxidizing gas is passed through the cathode. The anode and the cathode of MCFCs are isolated from one another by a porous ceramic matrix, which is saturated with carbonate electrolyte. In other words, the molten carbonate electrolyte matrix isolates fuel from oxidant, stores electrolyte, and facilitates ionic transport. The molten carbonate electrolyte matrix typically comprises a micro-porous ceramic structure made of fine and coarse particles and fibers to retain liquid electrolyte by capillary force. In one example, the molten carbonate electrolyte matrix includes a porous, unsintered lithium aluminate ($LiAlO_2$) powder ($\alpha$ or $\gamma$-phase), impregnated with carbonate electrolyte. Coarse particles, such as $Al_2O_3$ disk or boulder in the size range of 10-120 μm and/or alumina fibers, may be added to the molten carbonate electrolyte matrix to improve compressive strength, crack resistance and thermal cycle capability.

During MCFC operation at high temperature (e.g., 575-665° C.), the molten carbonate electrolyte matrix may undergo significant mechanical and thermal stresses mainly during thermal cycling between room temperature and cell operating temperatures where the electrolyte stored in the molten carbonate electrolyte matrix changes from liquid to solid. Due to the different coefficients of thermal expansion between carbonate electrolyte and the $LiAlO_2$ powder, the molten carbonate electrolyte matrix may crack (due to volume change) and lose its ability to separate anode and cathode gas. Stresses are more pronounced during the electrolyte transition from liquid phase to the solid phase as the cells/stack cool down, as this phase change occurs with a rapid volume change resulting in the formation of cracks that may reduce the matrix gas separation and sealing efficiency.

In order to provide effective gas sealing, the molten carbonate electrolyte matrix must have sufficient strength, mechanical integrity, and material endurance to withstand operational stresses, particularly during thermal cycles. In particular, the molten carbonate electrolyte matrix has to be able to sufficiently accommodate volume changes associated with carbonate melting and solidification during MCFC thermal cycling, provide resistance to pressure differences across the molten carbonate electrolyte matrix, and provide wet seal holding pressure over long periods of time.

To solve the matrix cracking problem, a commonly suggested method is to use a secondary phase of ceramic fiber or coarser particles as crack arrestors to reinforce the matrix during the thermal cycling steps and/or operation. The reinforcing agents described in the prior art mostly involve the use of alumina boulder (large particles), alumina, and/or lithium aluminate fibers/rods. For example, U.S. Pat. No. 4,322,482 discloses the use of alumina boulder as a crack attenuator to reinforce carbonate fuel cell matrix during transient and thermal cycling process. U.S. Pat. No. 5,316,555 discloses a porous carbonate matrix comprising lithium aluminate and about 5 to about 50 vol % of alumina or lithium aluminate fibers having an average diameter of 1 to about 50 microns and having an average length greater than about 5 times the average diameter. U.S. Pat. No. 7,790,327 discloses a reinforced carbonate matrix including a sintered body of a mixture comprising $LiAlO_2$ (matrix powder) and a reinforcing agent $B_2O_3$ that results in the formation of a secondary phase ($Li_2AlBO_4$). The main drawback of using alumina boulders and fibers is that they react with the molten electrolyte to form lithium aluminate, which causes volume change, decreased fiber/boulder/rod strength, and significant reduction of the electrolyte inventory that will adversely affect matrix strength, gas sealing efficiency and fuel cell life.

A need exists for improved technology, including an improved molten carbonate matrix which can withstand higher mechanical and thermal stresses during cell operation, thermal cycling and transient conditions.

SUMMARY

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

In some embodiments, a reinforced electrolyte matrix for a molten carbonate fuel cell includes a porous ceramic matrix, a molten carbonate salt provided in the porous ceramic matrix, and at least one reinforcing structure comprised of at least one of yttrium, zirconium, cerium or oxides thereof. The reinforcing structure does not react with the molten carbonate salt.

In some embodiments, a reinforced electrolyte matrix for a molten carbonate fuel cell includes a porous ceramic matrix, a molten carbonate salt provided in the porous ceramic matrix, and at least one reinforcing structure comprised of at least one of yttrium, zirconium, cerium or oxides thereof. The reinforcing structure does not react with the molten carbonate salt. The reinforced electrolyte matrix separates a porous anode and a porous cathode in the molten carbonate fuel cell.

In some embodiments, a method of manufacturing a reinforced electrolyte matrix for a molten carbonate fuel cell includes preparing a matrix slurry comprised of a solvent, lithium aluminate powder, carbonate salt, and at least one reinforcing structure comprised of at least one of yttrium, zirconium, cerium or oxides thereof, tape casting the slurry, and drying the slurry to form the reinforced electrolyte matrix. The reinforcing structure does not react with the carbonate salt.

BRIEF DESCRIPTION OF THE DRAWINGS

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the figures, in general, embodiments of the present application are directed to a reinforced molten carbonate electrolyte matrix of a molten carbon fuel cell and a method of manufacturing the reinforced molten carbonate electrolyte matrix. A molten carbonate fuel cell assembly includes a porous anode (e.g., a porous nickel-based alloy anode such as a Ni—Al anode and/or a Ni—Cr anode) and a porous cathode (e.g., a porous lithiated nickel oxide cathode), separated by a molten carbonate electrolyte matrix. A molten carbonate electrolyte matrix includes molten carbonate salt stored in a porous ceramic matrix. The porous ceramic matrix may be, for example, a porous, unsintered lithium aluminate ($LiAlO_2$) powder ($\alpha$ or $\gamma$-phase), while the molten carbonate salt may be, for example, lithium carbonate, potassium carbonate, sodium carbonate, or combinations thereof. In some examples, the molten carbonate salt may be any alkali carbonate that can be modified with alkali earth additives, for example, MgO, $BaCO_3$, $CaCO_3$ or $SrCO_3$. The molten carbonate electrolyte matrix is impregnated with at least one reinforcing structure to form the reinforced molten carbonate electrolyte matrix described in the embodiments of the present application.

The reinforcing structure does not react with the electrolyte and enhances the mechanical strength of the molten carbonate electrolyte matrix. The reinforcing structure is comprised of at least one of yttrium, zirconium, cerium or oxides thereof. In some examples, the reinforcing structure may be comprised of a substrate having a rod, fiber, whisker, or boulder shape and a coating for the substrate comprised of yttria-stabilized zirconia, yttria, zirconia or ceria. In other examples, the substrate itself is comprised of yttria-stabilized zirconia, yttria, zirconia or ceria formed in a rod, fiber, whisker, or boulder shape.

Figure 8:
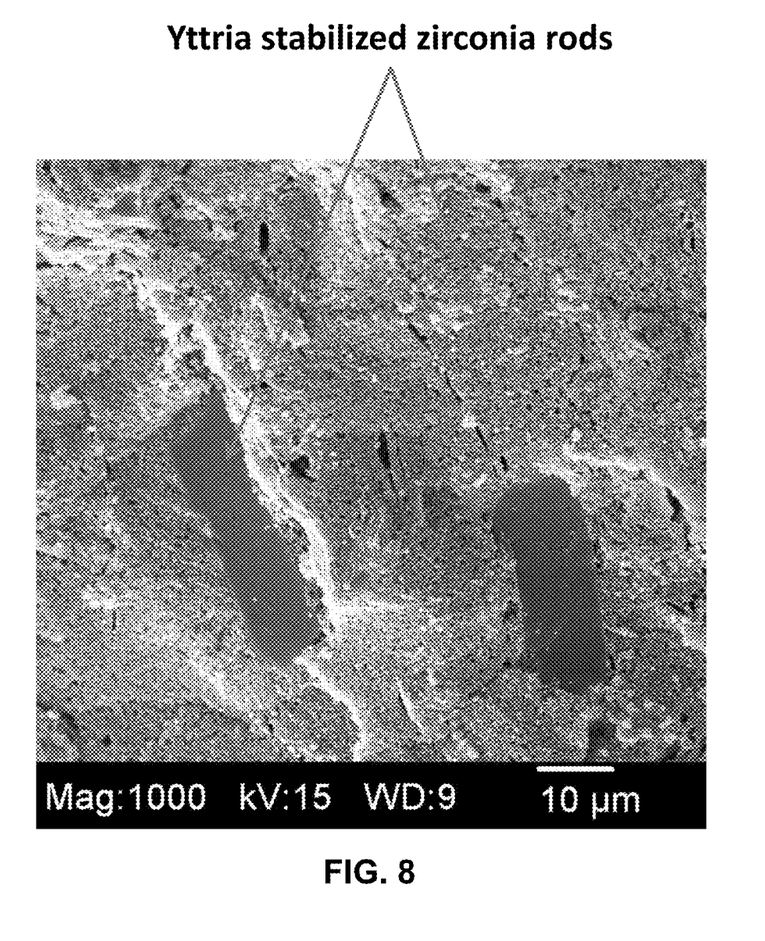
FIG. 8 is a scanning electron microscope (SEM) image illustrating yttria-stabilized zirconia rods in a molten carbonate fuel cell matrix.

In one example, the reinforcing structure may be one or more yttria-stabilized zirconia rods. See FIG. 8. The yttria-stabilized zirconia rods may have an average diameter of 1 to 50 μm and an average length of 10 μm to 100 μm.

In another example, the reinforcing structure may be one or more yttria-coated alumina fibers. The yttria-coated alumina fibers may have an average diameter of 1 to 50 μm and an average length of 10 μm to 100 μm.

In yet another example, the reinforcing structure may be one or more alumina-zirconia ($Al_2O_3$—$ZrO_2$) boulders. In some aspects, the alumina-zirconia boulders may be a eutectic ceramic material comprised of 60 wt % $Al_2O_3$ and 40 wt % $ZrO_2$. The average particle size of the alumina-zirconia boulders is 10 μm to 120 μm or 20 μm to 120 μm.

In additional examples, the reinforcing structure may be any combination of yttria-stabilized zirconia rods, yttria-coated alumina fibers, and alumina-zirconia boulders. In some examples, a rod may have a slightly larger diameter than a fiber.

The reinforcing structure may be present in an amount of 5 vol % to 30 vol % of the solid volume of the matrix. The reinforcing structures may be used alone to reinforce the matrix, or combined with traditional crack arrestors such as alumina boulder (large particles), alumina and/or lithium aluminate fibers/rods to reinforce the matrix. In some examples, the reinforcing support may be a mixture of baseline alumina and non-consuming electrolyte supports such as yttria-stabilized zirconia rods, yttria-coated alumina fibers, and alumina-zirconia boulders, where the amount of baseline alumina boulder may vary from 1 wt % to 50 wt % (i.e., wt % of the mixture of alumina and non-consuming electrolyte support. For example, if the mixture contains 10 wt % alumina, the balance will be 90 wt % of other stable supports.

In some embodiments, the reinforced molten carbonate electrolyte matrix includes a mixture of lithium aluminate particulates, lithium precursor, metal additive, and at least one reinforcing structure. The lithium aluminate particulates form the porous matrix. The lithium aluminate particulates are present in an amount of 10 vol % to 50 vol % based on the solid volume. The lithium precursor may be lithium carbonate (i.e., the electrolyte). The metal additive may be comprised of traditional reinforcing metal aluminum particles or aluminum flakes. The at least one reinforcing structure includes at least one of yttria-stabilized zirconia rods, yttria-coated alumina fibers, alumina-zirconia boulders, and combinations thereof. The $Al_2O_3$—$ZrO_2$ boulders may include 60 wt % $Al_2O_3$ and 40 wt % $ZrO_2$.

Figure 1A:
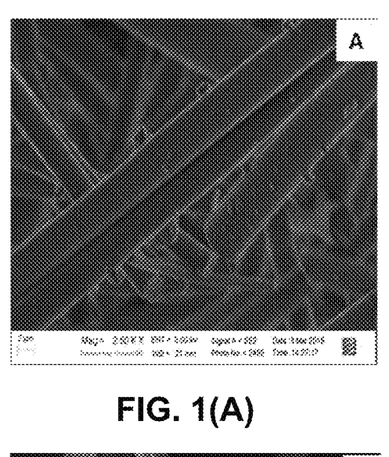
FIGS. 1(A) and 1(B) are scanning electron microscope (SEM) images illustrating alumina fibers before immersion (FIG. 1(A)) and after immersion (FIG. 1(B)) in a molten carbonate electrolyte in air at 650° C. for 150 hours.
Figure 1B:
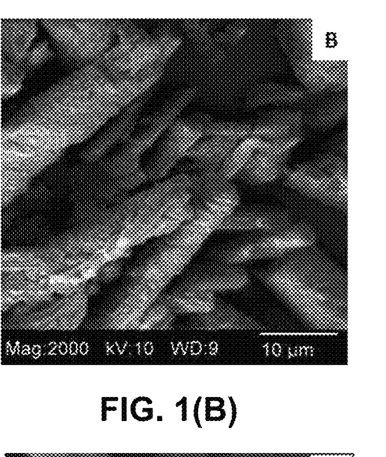
Figure 2A:
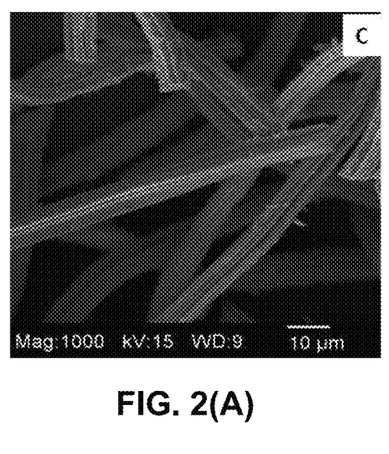
FIGS. 2(A) and 2(B) are scanning electron microscope (SEM) images illustrating yttria-stabilized zirconia rods before immersion (FIG. 2(A)) and after immersion (FIG. 2(B)) in a molten carbonate electrolyte in air at 650° C. for 150 hours.
Figure 2B:
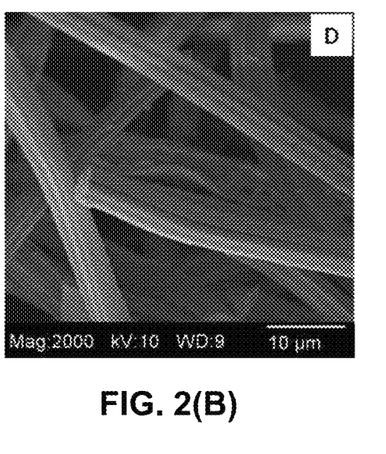

The reinforcing structures of the embodiments of the present application display higher stability in molten carbonate during conditioning and operation compared to the alumina rods and fibers disclosed in the prior art. Out-of-cell tests were conducted to evaluate the stability of yttria-stabilized zirconia rods, yttria-coated alumina fibers, and $Al_2O_3$—$ZrO_2$ boulders in molten carbonate in air at temperature of 650° C. These tests were performed by mixing 10 g of reinforcing structures and 10 g of LiNa carbonate electrolyte, heating the mixture in air at a temperature of 650° C. for 150 hours, and then washing the samples with an acid solution composed of 70 vol % of glacial acetic acid and 30 vol % of anhydrous acetic to remove excess electrolyte and prepare samples for x-ray diffraction (XRD), Brunauer-Emmett-Teller (BET), and surface morphology analyses. High resolution scanning electron microscope (SEM) analysis showed that after electrolyte immersion, alumina fibers exhibited a rough surface, indicating significant corrosion due to reaction with the molten electrolyte. See FIGS. 1(A) and 2(A). In contrast, after electrolyte immersion, yttria-stabilized zirconia rods exhibited a smooth surface (see FIGS. 2(A) and 2(B), suggesting minimal or no reaction with the molten electrolyte. These results were confirmed by X-ray diffraction that showed no additional phase formation in the case of yttria-stabilized zirconia rods.

Experiment 1—Method of Manufacturing
Yttria-Coated Alumina Fibers

Figure 3:
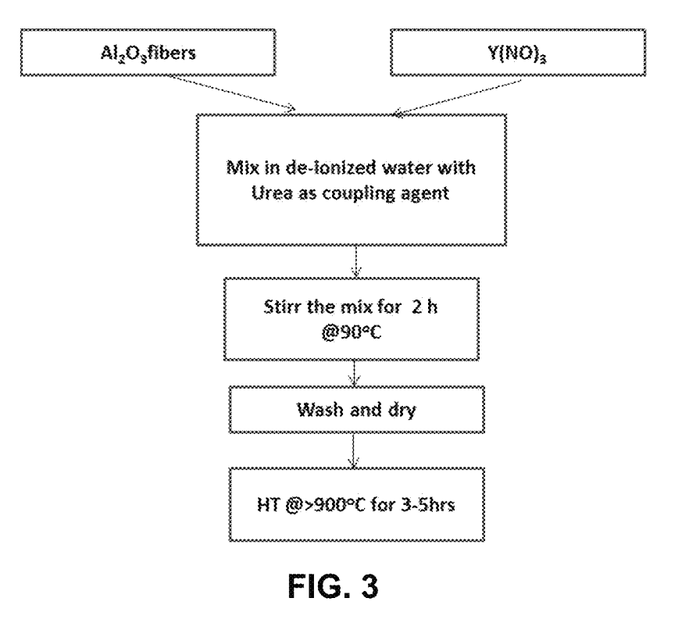
FIG. 3 is a flow chart illustrating a method of manufacturing yttria aluminate coated alumina fibers. This method can also be used to manufacture yttria aluminate coated alumina rods or boulders.

In some embodiments, the reinforcing structure includes yttria-coated alumina fibers, for example, alumina fibers coated with yttria aluminate. One example of a method of manufacturing alumina fibers coated with yttria aluminate is illustrated in the flow chart of FIG. 3. Yttria aluminate is synthesized from an aqueous mixture comprising yttrium salt, in particular, 0.15 g to 1 g yttrium nitrate, and 10 g to 20 g of alumina fibers. A coupling agent such as urea or dicyclohexylcarbodiimide may optionally be combined with the yttrium salt and the alumina fibers. The mixture is then stirred for 2-5 hours at a temperature of 80-90° C., then dried and calcined at high temperatures (>900° C.) for 2-5 hours to complete the formation of a stable protective layer of yttria aluminate on the surface of the alumina fibers. Although FIG. 3 illustrates the method of coating alumina fibers with yttria aluminate, one of ordinary skill in the art will understand that the same method can be used to coat alumina rods or alumina boulders with yttria aluminate.

Figure 4A:
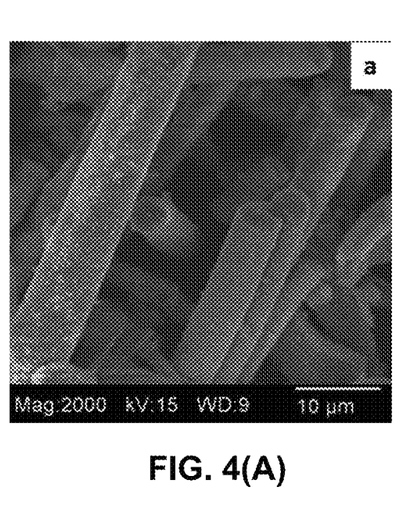
FIGS. 4(A) and 4(B) are scanning electron microscope (SEM) images illustrating yttria aluminate coated alumina fibers (FIG. 4(A)) and alumina fibers without an yttria aluminate coating (FIG. 4(B)) after immersion in a molten carbonate electrolyte in air at 650° C. for 150 hours.
Figure 4B:
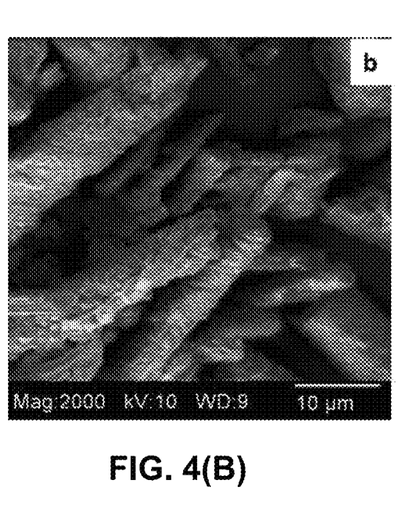

Electrolyte immersion tests were conducted in air at a temperature of 650° C. for 150 hours to assess the stability of the yttria aluminate coated alumina fibers. Post-test analysis showed good results in terms of phase stability and surface morphology of coated fibers. See SEM images of FIGS. 4A and 4B. High resolution SEM analysis showed that the alumina fibers coated with yttria aluminate had a very smooth surface after the immersion tests, indicating a minimal or no reaction with the electrolyte (see FIGS. 4(A) and 4(B)). These results confirm that the yttria aluminate film is stable in molten carbonate electrolyte and offers efficient protection against lithiation of alumina. X-ray diffraction analysis of yttria-coated alumina confirmed the formation of yttria aluminate phase, as well as its excellent stability in molten carbonate electrolyte.

Experiment 2—Method of Manufacturing
Yttria-Stabilized Zirconia Rods and Comparison
with Conventional Matrices In this example green tape matrices made with the reinforcing structures described above were prepared to evaluate strength, as well as the matrix gas sealing efficiency during operation and thermal cycling. A green tape matrix is made of at least two green layers that are laminated, each layer having the same composition. For example, a yttria-stabilized zirconia reinforced green tape matrix may be made of laminated green layers containing yttria-stabilized zirconia rods. Matrix slurries were prepared by mixing and milling ($LiAlO_2$) support and carbonate electrolyte additives such as $Li_2CO_3$ in an organic solvent that is compatible with all the matrix ingredients (i.e., does not react with the matrix ingredients) such as methyl ethyl ketone (MEK) and/or a mixture of MEK and cyclohexane containing an appropriate dispersant such as fish oil (1-8 wt %) or Hypermer KD-1. The dispersant may be any dispersant that provides efficient de-agglomeration or deflocculation during the milling process. An attrition milling technique using YTZ® grinding media having 0.3 mm to 3 mm ball size with an average loading between 60 to 80 wt % and a grinding speed of approximately 2000 rpm is used to mill the mixture and achieve the desired average particle size, for example, less than 1 μm. After achieving the desired average particle size for the mixture containing $LiAlO_2$ and carbonate electrolyte additive, other metal additives such as aluminum particles and/or aluminum flakes were added and milled to achieve a less than 1 μm average particle size.

The slurry was separated into three portions. The first portion comprised Comparative Example 1, where a known amount of alumina boulder (10 vol % to 20 vol % of the dried green tape) was added to the slurry with an appropriate amount of a binder system (17 wt % to 22 wt %) containing acryloid B-72 and a plasticizer santicizer S160 (butyl benzyl phthalate) to prepare a baseline matrix.

To form Comparative Example 2, a traditional crack arrestor, in particular, alumina fibers was added to the second portion of the slurry in an amount of 10 vol % to 20 vol % of the dried green tape, preferably, 15 vol %, with an appropriate amount of a binder system (17 wt % to 22 wt %) containing acryloid polymer B-72 and a plasticizer santicizer S160 (butyl benzyl phthalate). Only one type of crack arrestor was added to each slurry.

To form Example 1, a reinforcing structure made of a plurality of yttria-stabilized zirconia rods was added to the third portion of the slurry in an amount of 10 vol % to 20 vol % of the dried green tape, for example, 15 vol %, with an appropriate amount of a binder system (17 wt % to 22 wt %) containing acryloid polymer B-72 and a plasticizer santicizer S160 (butyl benzyl phthalate).

The slurries comprising Comparative Example 1, Comparative Example 2, and Example 1 were separately tape cast using a doctor blade and dried at about 50-60° C. for 20-60 minutes and laminated to form green tapes. The green tapes were then heat treated at approximately 500° C. for two hours and the products were used as the samples in a pore structure analysis and three-point bending tests (snap strength/bending measurements).

Figure 5:
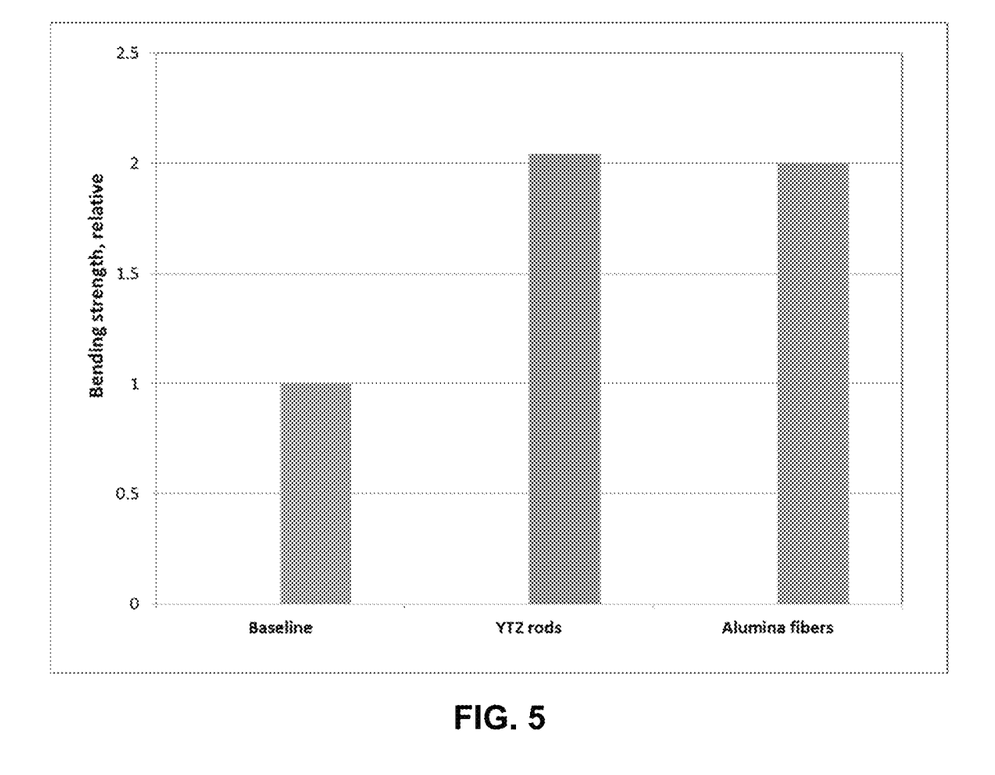
FIG. 5 is a graph comparing the bending strength for a baseline matrix, a molten carbonate electrolyte matrix reinforced with yttria-stabilized zirconia rods, and a molten carbonate electrolyte matrix reinforced with alumina fibers.

Bending tests conducted on the samples showed that the reinforced matrix including yttria-stabilized zirconia rods (Example 1) exhibited significant improvement in strength compared to the baseline matrix (Comparative Example 1). Both the reinforced matrix including yttria-stabilized zirconia rods (Example 1) and the matrix including alumina fibers (Comparative Example 2) showed greater than 2 times improvement in snap strength vs. the conventional, baseline matrix (Comparative Example 1). See FIG. 5. In addition, the use of yttria-stabilized zirconia rods has a big advantage compared to the use of alumina fibers, namely, excellent stability in molten carbonate electrolyte as the yttria-stabilized zirconia stabilizes against lithiation. See FIGS. 1 and 2.

Figure 6:
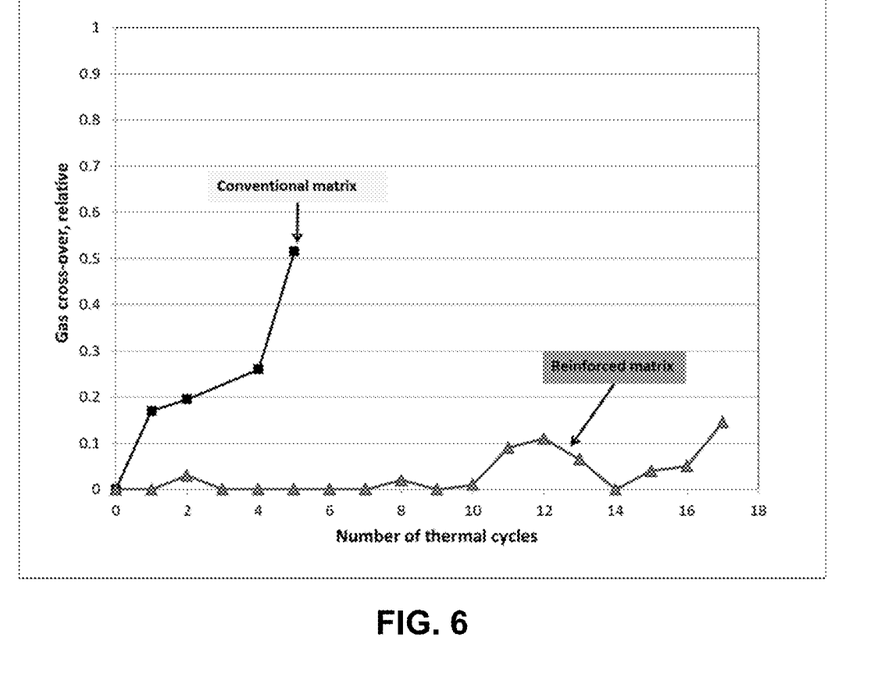
FIG. 6 is a graph comparing the gas cross-over stability of a baseline matrix and a molten carbonate electrolyte matrix reinforced with yttria-stabilized zirconia rods over thermal cycles.

Experiment 3—Use of Yttria-Stabilized Zirconia Rods in a Fuel Cell and Comparison with Conventional Matrix In order to highlight the benefit of yttria-stabilized zirconia reinforced matrix, several single fuel cells were built and operated under normal conditions (160 mA/cm$^2$ and 75% fuel utilization) and subjected to thermal cycling tests from operating temperature (650° C.) to 150° C. to evaluate the matrix thermal cycle capability and gas sealing efficiency (crack resistance). Each single fuel cell assembly was comprised of a porous 80 wt % Ni—Al and 20 wt % Ni—Cr anode and a porous in-situ oxidized and lithiated NiO cathode, separated by a porous ceramic matrix (LiAlO$_2$) (either a baseline matrix such as Comparative Example 1 in Experiment 2 or the reinforced matrix with yttria-stabilized zirconia rods such as Example 1 in Experiment 2). The cathode (250 cm$^2$) was filled with an appropriate amount of Li/Na electrolyte and an appropriate amount of Li/Na electrolyte is also stored in cathode current collector to achieve the electrolyte balance required for life. FIG. 6 shows a comparison of gas cross-over stability of the baseline matrix vs. the reinforced matrix with yttria-stabilized zirconia rods over a number of thermal cycles. Results show that the reinforced matrix exhibits improved gas sealing efficiency compared to the baseline matrix, which is believed to be due to the reinforced matrix having an enhanced crack resistance. The presence of yttria-stabilized zirconia rods increases the matrix snap strength, as well as the crack deflection capability, leading to improved gas sealing efficiency. See Results of Experiment 2. The gas cross-over is considered an indirect evaluation of matrix resistance against cracks.

Figure 7A:
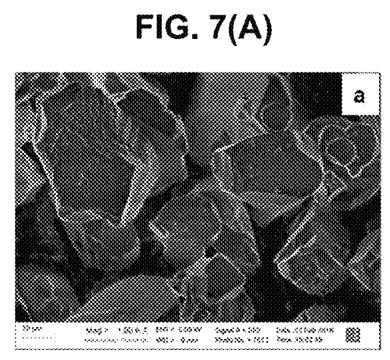
FIGS. 7(A)-7(D) are scanning electron microscope (SEM) images illustrating alumina boulders before immersion (FIG. 7(A)) and after immersion (FIG. 7(B)) in a molten carbonate electrolyte in air at 650° C. for 150 hours, and alumina-zirconia before immersion (FIG. 7(C)) and after immersion (FIG. 7(D)) in a molten carbonate electrolyte in air at 650° C. for 150 hours.
Figure 7B:
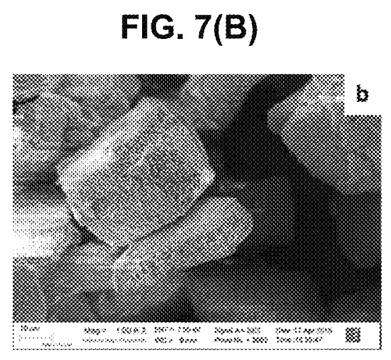
Figure 7C:
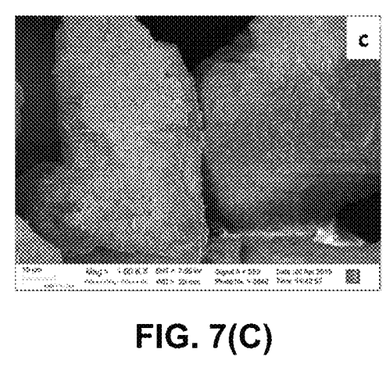
Figure 7D:
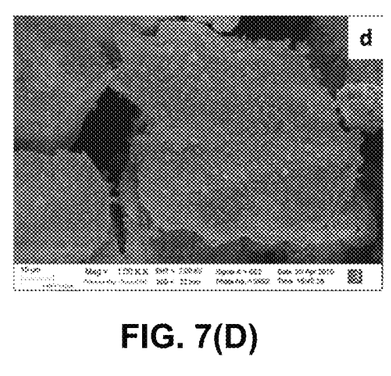

Experiment 4—Use of Alumina-Zirconia Boulders and Comparison with Conventional Matrix In order to evaluate the stability of a reinforcing structure comprised of alumina-zirconia boulders in molten carbonate electrolyte, several out-of-cell tests were conducted in air at 650° C. for 150 hours. The alumina-zirconia boulders evaluated were comprised of 60% alumina and 40% zirconia. High resolution SEM analysis of washed samples after electrolyte immersion tests showed no sign of corrosion or a very minor change on the surface of alumina-zirconia boulders (see FIGS. 7(C) and 7(D)), while baseline alumina boulders exhibited a very rough surface (see FIGS. 7(A) and 7(B)), suggesting significant reaction with Li$_2$CO$_3$ from the electrolyte. BET surface area measurements after electrolyte immersion test also showed a small increase of 0.3 m$^2$/g to 0.8 m$^2$/g in the case of alumina-zirconia boulders, while in the case of alumina boulders, the increase was more pronounced (0.16 m$^2$/g to 3.4 m$^2$/g), confirming that alumina-zirconia boulders have improved stability in molten carbonate and exhibit reduced lithiation reaction. Out of cell tests conducted under anode and cathode gas atmospheres showed no change in BET surface area measurements for alumina-zirconia boulders (0.3 m$^2$/g) compared to a greater than three times increase in BET surface area measurements for baseline alumina boulders (0.16 m$^2$/g to 0.6 m$^2$/g after test). The use of a stable reinforcing structure such as the alumina-zirconia boulders reduces electrolyte consumption and maintains stable matrix strength.

The molten carbonate electrolyte matrices described above can also be manufactured using other techniques such as tape casting, pressure die casting, slip casting, extrusion, additive manufacturing techniques, or any other suitable method.

The reinforced molten carbonate electrolyte matrices for molten carbon fuel cells described above can withstand higher mechanical and thermal stresses during cell operation, thermal cycling and transient conditions. Unlike conventional crack arrestors (e.g., alumina boulder (large particles), alumina and/or lithium aluminate fibers/rods) the reinforcing structures described above (e.g., yttria-stabilized zirconia rods, yttria-coated alumina fibers, alumina-zirconia boulders, and combination thereof) do not react with the molten carbonate electrolyte, thereby enhancing the mechanical strength of the molten carbonate electrolyte matrix.

The construction and arrangements of the reinforced molten carbonate electrolyte matrix for molten carbon fuel cells and the methods of manufacturing the reinforced molten carbonate electrolyte matrix, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, image processing and segmentation algorithms, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

What is claimed:

1. A reinforced electrolyte matrix for a molten carbonate fuel cell comprising:
    a porous ceramic matrix;
    a molten carbonate salt provided in the porous ceramic matrix; and
    at least one reinforcing structure comprising:
        (a) rod, fiber, whisker, or boulder consisting of yttrium, cerium, zirconium, yttria, ceria, zirconia, or alumina, and coated with a protective film of yttria-stabilized zirconia, yttria, zirconia, yttria-aluminate, or ceria on the surface of the rod, fiber, whisker or boulder;
        (b) an alumina-zirconia boulder comprising a eutectic ceramic material including alumina and zirconia; or
        (c) combinations thereof;
    wherein the reinforcing structure does not react with the molten carbonate salt.

2. The reinforced electrolyte matrix of claim 1, wherein the reinforcing structure comprises (a) the rod, fiber, whisker, or boulder consisting of yttrium, cerium, zirconium, yttria, ceria, zirconia, or alumina, and coated with a protective film of yttria-stabilized zirconia, yttria, zirconia, yttria-aluminate, or ceria on the surface of the rod, fiber, whisker, or boulder.

3. The reinforced electrolyte matrix of claim 1, wherein the reinforcing structure comprises (b) the alumina-zirconia boulder comprising a eutectic ceramic material including alumina and zirconia.

4. The reinforced electrolyte matrix of claim 3, wherein the alumina-zirconia boulder comprises alumina in an amount of 60 wt % and zirconia in an amount of 40 wt %.

5. The reinforced electrolyte matrix of claim 3, wherein an average particle size of the alumina-zirconia boulder is from 10 μm to 120 μm.

6. The reinforced electrolyte matrix of claim 1, wherein the reinforcing structure is a rod or a fiber consisting of yttrium, cerium, zirconium, yttria, ceria, zirconia, or alumina, and coated with a protective film of yttria-stabilized zirconia, yttria, zirconia, yttria-aluminate, or ceria on the surface of the rod or fiber and having an average diameter of 1 μm to 50 μm, and an average length of 10 μm to 100 μm.

7. The reinforced electrolyte matrix of claim 1, wherein the reinforcing structure is a yttria-coated alumina fiber, the alumina-zirconia boulder, or a combination thereof.

8. The reinforced electrolyte matrix of claim 1, wherein the reinforcing structure is present in an amount of 5 vol % to 30 vol % of a solid volume of the reinforced electrolyte matrix.

9. The reinforced electrolyte matrix of claim 1, further comprising at least one crack arrestor comprising alumina, lithium aluminate, or a combination thereof;
    wherein the crack arrestor is provided as a boulder, a fiber, or a rod.

10. The reinforced electrolyte matrix of claim 1, wherein:
    the porous ceramic matrix comprises lithium aluminate powder; and
    the molten carbonate salt comprises lithium carbonate, sodium carbonate, potassium carbonate, or combinations thereof.

11. The reinforced electrolyte matrix of claim 1, wherein the porous ceramic matrix comprises lithium aluminate powder, and is present in an amount of 10 vol % to 50 vol % of a solid volume of the reinforced electrolyte matrix.

12. The reinforced electrolyte matrix of claim 1, wherein the molten carbonate salt comprises at least one alkali carbonate.

13. The reinforced electrolyte matrix of claim 1, wherein the molten carbonate salt comprises lithium carbonate, potassium carbonate, sodium carbonate, or combinations thereof.

14. The reinforced electrolyte matrix of claim 1, wherein the rod or fiber consisting of yttrium, cerium, zirconium, yttria, ceria, zirconia, or alumina is coated with yttria or yttria-aluminate.

15. A molten carbonate fuel cell comprising:
    a porous anode;
    a porous cathode; and
    the reinforced electrolyte matrix of claim 1 provided between the porous anode and the porous cathode.

16. The molten carbonate fuel cell of claim 15, wherein:
    the porous anode comprises a porous nickel-based alloy anode;
    the porous cathode comprises a porous lithiated nickel oxide cathode; and
    in the reinforced electrolyte matrix,
    the porous ceramic matrix comprises lithium aluminate powder; and
    the molten carbonate salt comprises lithium carbonate, sodium carbonate, potassium carbonate, or combinations thereof.

17. A method of manufacturing a reinforced electrolyte matrix for a molten carbonate fuel cell, the method comprising:
    preparing a matrix slurry comprised of a solvent, lithium aluminate powder, carbonate salt, and at least one reinforcing structure comprising:
        (a) a rod, fiber, whisker, or boulder consisting of yttrium, cerium, zirconium, yttria, ceria, zirconia, or alumina, and coated with a protective film of yttria-stabilized zirconia, yttria, zirconia, yttria-aluminate, or ceria on the surface of the rod, fiber, whisker, or boulder;
        (b) an alumina-zirconia boulder comprising a eutectic ceramic material including alumina and zirconia; or
        (c) combinations thereof;
    tape casting the slurry; and
    drying the slurry to form the reinforced electrolyte matrix;
    wherein the reinforcing structure does not react with the carbonate salt.

18. The method of claim 17,
    wherein the reinforcing structure is present in an amount of 5 vol % to 30 vol % of a solid volume of the reinforced electrolyte matrix.

19. The method of claim 17, wherein the reinforcing structure comprises:
    a rod or a fiber consisting of yttrium, cerium, zirconium, yttria, ceria, zirconia, or alumina, and coated with yttria-stabilized zirconia, yttria, yttria-aluminate, zirconia, or ceria and having an average diameter of 1 μm to 50 μm and an average length of 10 μm to 100 μm;
    a boulder having an average particle size of 10 μm to 120 μm; or
    a combination thereof.

20. The method of claim 17, wherein prior to tape casting, the slurry further comprises at least one crack arrestor comprised of alumina, lithium aluminate, or a combination thereof, and wherein the crack arrestor is provided as a boulder, a fiber, or a rod.

* * * * *